United States Patent [19]

Cunningham et al.

[11] 3,937,382

[45] Feb. 10, 1976

[54] INTERNAL PIPE CLAMP WITH WELD BACKUP

[75] Inventors: Joseph A. Cunningham, Tulsa; Jimmy L. White, Broken Arrow, both of Okla.

[73] Assignee: H. C. Price Co., Bartlesville, Okla.

[22] Filed: Jan. 2, 1975

[21] Appl. No.: 538,089

[52] U.S. Cl.................................. 228/49; 228/50
[51] Int. Cl.²........................................ B23K 37/04
[58] Field of Search ....... 228/49, 50, 212, 213, 214, 228/215, 216, 4, 44; 29/200 P, 272

[56] References Cited
UNITED STATES PATENTS

| 2,472,523 | 6/1949 | Dillon et al. | 228/50 |
| 3,261,529 | 7/1966 | Pagan | 228/216 X |
| 3,425,614 | 2/1969 | Clark | 228/49 |
| 3,750,928 | 8/1973 | Valentine | 228/50 X |

Primary Examiner—James L. Jones, Jr.
Assistant Examiner—Margaret Joyce
Attorney, Agent, or Firm—Lowe, Kokjer, Kircher, Wharton & Bowman

[57] ABSTRACT

An internal pipe clamp is provided by the present invention. The clamp is designed to clamp two joints of pipe into position for a circumferential weld. The clamp includes mechanism for spacing the two joints apart a very short distance to facilitate welding. A backup member is provided which is movable from a retracted position. The backup member comprises two backup portions each of which comprises two pivotally coupled backup segments. Each segment extends through an arc of approximately 90° and terminates in a wedge shaped end that is complemental to the wedge shaped end of an adjacent segment. Power cylinders move each segment from a retracted to an extended position. Power cylinders are also coupled in opposed relationship with each adjacent pair of wedge shaped ends to force same into tight contiguous relationship when the segments are extended.

27 Claims, 14 Drawing Figures

Fig. 13.

INTERNAL PIPE CLAMP WITH WELD BACKUP

This invention relates generally to internal pipe clamps and more particularly to an improved internal pipe clamp employing a weld backup.

Internal pipe clamps have commonly been employed in the construction of pipelines of various diameters. Such lineup clamps are generally self propelled and designed to travel along the pipes as the latter are laid over cross-country terrain. For certain welding techniques, it is also necessary to incorporate a weld backup into the clamp to facilitate the welding operation. The weld backup is very critical and must be designed to minimize transfer or pickup of material from the backup into the weld metal during the welding operation.

Heretofore, the backup for pipe chambers normally comprised a plurality of wedge-shaped segments which are capable of moving from retracted positions to extended positions in backing relationship to the weld seam. Such a construction was considered necessary as a practical means of accommodating retraction of the backup yet providing a substantially continuous uninterrupted member in its weld joint backing position. With relatively large diameter pipe a substantial number of individual wedge-shaped segments are necessary to comprise the weld backup. For 36 to 48 inch pipe, approximately 24 to 36 such segments have been used. This results in a very large number of seams in the backup member even though the wedges are forced into tight engagement.

Each seam in the backuup is a potential source of welding deficiency because of the changes in characteristics of the backup at the location. In many instances the substantial problems encountered with weld backups as an integral adjunct for lineup clamps have lead to elimination of the backup and made necessary the use of a welding device located inside the pipe. The problems associated with remotely controlling and operating such an internal welding device are enormous and should be avoided if at all possible.

It is therefore a primary object of the present invention to provide a weld backup for use internally of a circumferential object wherein the backup presents a minimal number of seams to minimize variations in welding conditions.

As a corollary to the above object, an aim of the invention is to provide a weld backup having a minimal number of seams yet which is retractable to accommodate movement along the cylindrical object and also variations in the wall thickness of the object.

As still another corollary to the object set forth above, an objective of the invention is to provide a weld backup having a minimal number of break seams and wherein the backup is incorporated into an internal lineup clamp for the cylindrical object to be welded.

Another one of the aims of this invention is to provide a weld backup having a minimal number of seams therein and which is incorporated into an internal lineup clamp having the capability of spacing apart two cylindrical objects to be welded to assist in assuring proper weld penetration and uniform weld characteristics.

It is also one of the objectives of this invention to provide a weld backup for cylindrical objects with a minimal number of break seams in the backup and the elimination of all seams at the 12, 3, 6, and 9 o'clock positions where the welding parameters are most critical.

Still another one of the objects of this invention is to provide a weld backup having a minimal number of break seams and integrated into an internal lineup clamp which incorporates a retractible sensor for precisely positioning the clamp yet which in no way interferes with expansion or retraction of the backup.

A further aim of the invention is to provide a weld backup and lineup clamp as described in the foregoing objects which is operable through an air-over-hydraulic actuating system so as to minimize problems in disconnecting the system while maximizing operating efficiency in all kinds of weather.

Other objects of the invention will be made clear or become apparent from the following description and claims when read in light of the accompanying drawings wherein:

Figure 1:
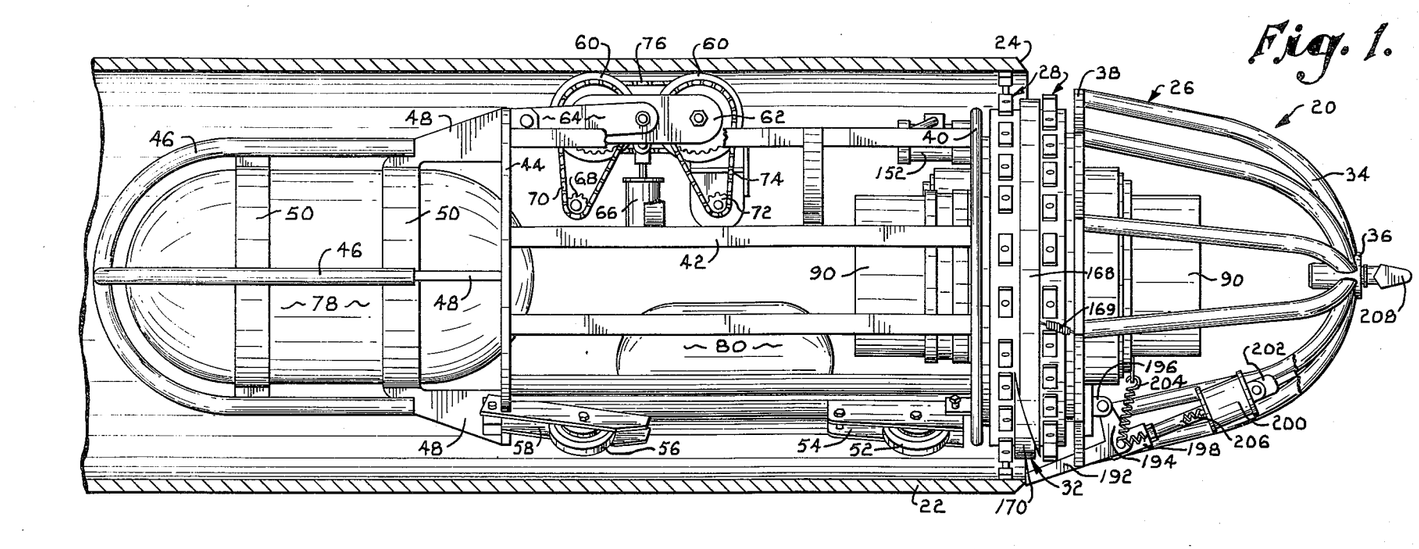
FIG. 1 is a side elevational view of the lineup clamp of the present invention disposed within a pipe joint which has been cut away and shown in cross section to reveal the entire lineup clamp.

Referring initially to FIG. 1 of the drawings, the internal lineup clamp of the present invention is designated generally by the numeral 20 and is intended for use with two cylindrical objects such as a pipe joint 22 which is to be welded to another pipe joint. Pipe joint 22 has a beveled end 24 to facilitate welding to another joint having a similarly beveled end as will be explained more fully hereinafter.

Lineup clamp 20 comprises a carriage type framework 26 which in turn mounts first and second sets of clamping members 28 as well as weld backup 32. Referring initially to details of the construction of framework 26, a plurality of rigid bars 34 are welded at one end to a nose piece 36 and at the other end to an annular plate 38 of only slightly smaller outside diameter than the internal diameters of pipe 22. A second annular plate 40 is disposed in spaced relationship to plate 38 and has welded to it a plurality of longitudinally extending frame bars 42. Bars 42 are in turn welded to an annular ring 44 at the rearward end of the framework. Ring 44 mounts a plurality of curvilinear bars 46 through gusset plates 48 and annular bands 50.

Framework 26 is mounted for longitudinal movement along a pipe joint 22 by a tricycle wheel arrangement comprised as follows. Each of the two wheels 52 (one of which is visible in FIG. 1) is mounted to annular plate 40 by a bracket 54 and appropriate couplings. Each of the wheels 52 is disposed at an acute angle relative to a perpendicular bisector passing through the bottom wall of pipe joint 22. Each one of a second pair of wheels 56 (one of which is visible in FIG. 1) is mounted on a bracket 58 which is pivotally coupled with ring 44. Each of the second sets of wheels 56 is also positioned at an acute angle relative to a perpendicular bisector passing through the bottom wall of the pipe joint.

A third set of wheels 60 comprise the drive wheels for the framework and are disposed in a plane intermediate the location of each of the wheels 56 and 52. Drive wheels 60 are rotatably mounted on a bracket 62 which in turn is coupled with a pivotal arm 64 mounted on ring 44. A hydraulic cylinder 66 is coupled with bracket 62 for raising and lowering wheels 60 to bring them into and out of engagement with the internal surface of pipe joint 22. A first drive sprocket 68 and chain 70 drive one of the wheels 60 and a second sprocket 72 and drive chain 74 drive the other wheel. Wheels 60 are coupled together for turning in unison in either a forward or reverse direction by a chain 76.

Disposed at the rear of framework 26 and mounted within the cage presented by bars 46 and bands 50 is an air supply tank 78. A second and smaller air tank 80 is disposed forwardly of tank 78.

Figure 2:
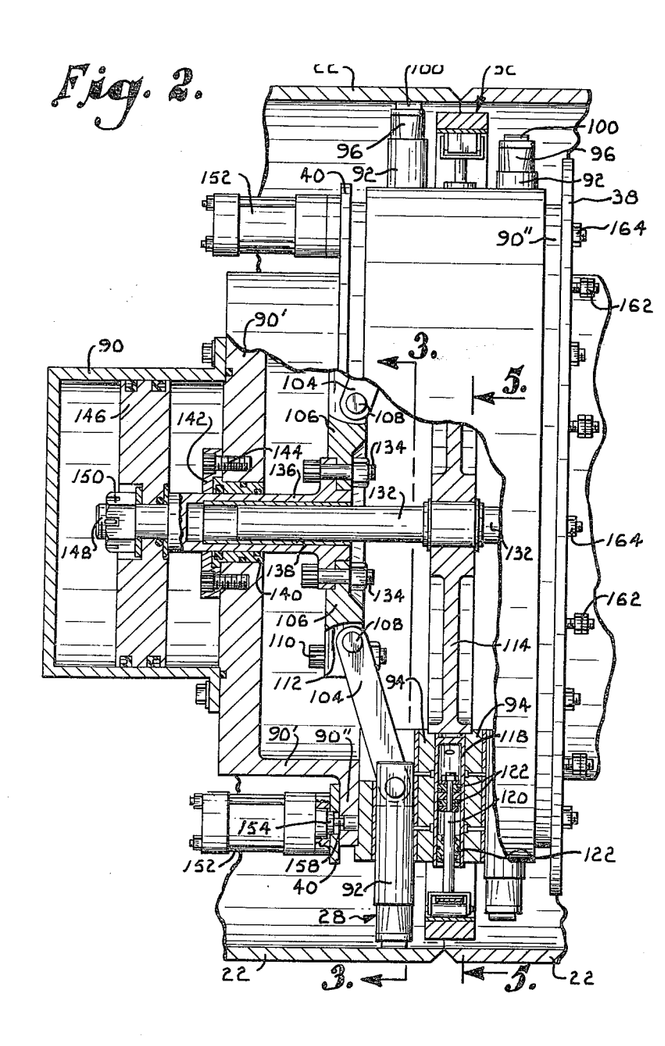
FIG. 2 is an enlarged fragmentary view of the clamp shown in FIG. 1, partially in elevation and with portions broken away and shown in cross section to reveal details of construction.
Figure 4:
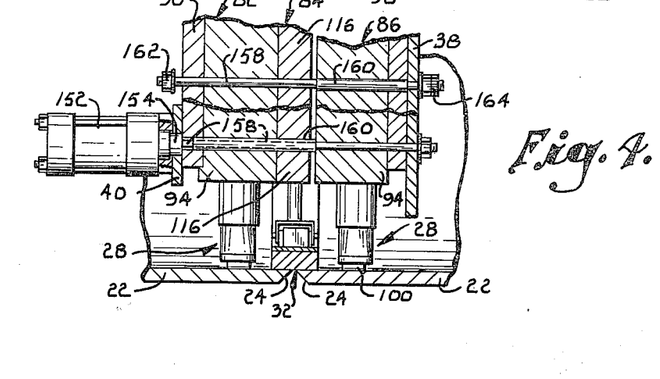
FIG. 4 is a fragmentary view, largely in cross section, illustrating the manner in which two housing sections are moved axially a short distance to space two pipe joints apart.

Referring additionally to FIGS. 2 and 4, disposed intermediate annular plates 38 and 40 are first, second, and third housing sections designated generally by the numerals 82–86. Each of the housing sections 82 and 86 is substantially identical in construction and serves to mount a plurality of circumferentially spaced clamping members 28. The third housing section 84 is rigidly coupled with housing section 82 and mounts the means for extending and retracting the weld backup 32 as will be explained more fully hereinafter. The actuating mechanism for clamping members 28 is enclosed within housings 90 disposed in opposed relationship on opposite sides of plates 38 and 40.

Figures 3, 6:
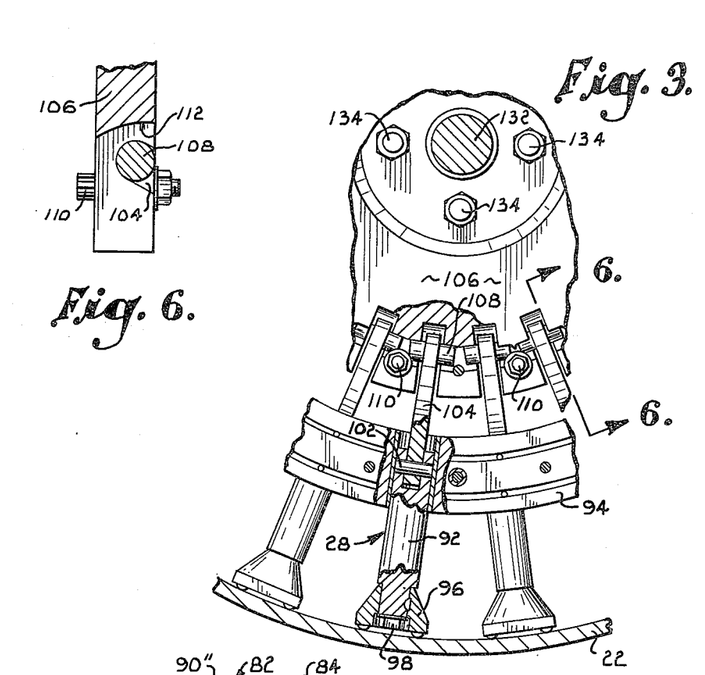
FIG. 3 is a fragmentary sectional view taken along line 3—3 of FIG. 2 with further portions being broken away and shown in cross section to illustrate details of construction.
FIG. 6 is a fragmentary view, partially in cross section and partially in elevation, taken along line 6—6 of FIG. 3.

Referring additionally to FIG. 3, each clamping member 28 comprises a piston 92 that is slidably received within a spider housing 94. Each end of each of the pistons 92 is fitted with a clamping head 96 that is held to the piston 92 by a bolt 98. Integral ribs 100 on each head 96 present pipe-engaging surfaces capable of accommodating a degree of out-of-roundness of the pipe. A pin 102 passing through each piston 92 is received by a link 104 to couple the pistons with a hub 106. To this end, a pin 108 is received by the hub for each link 104 and a nut and bolt assembly 110 passing through the hub in perpendicular relationship to pins 108 serves to hold two adjacent ends of the pins within slots 112 presented by hub 106 (See FIG. 6).

Figures 5, 7, 8, 9:
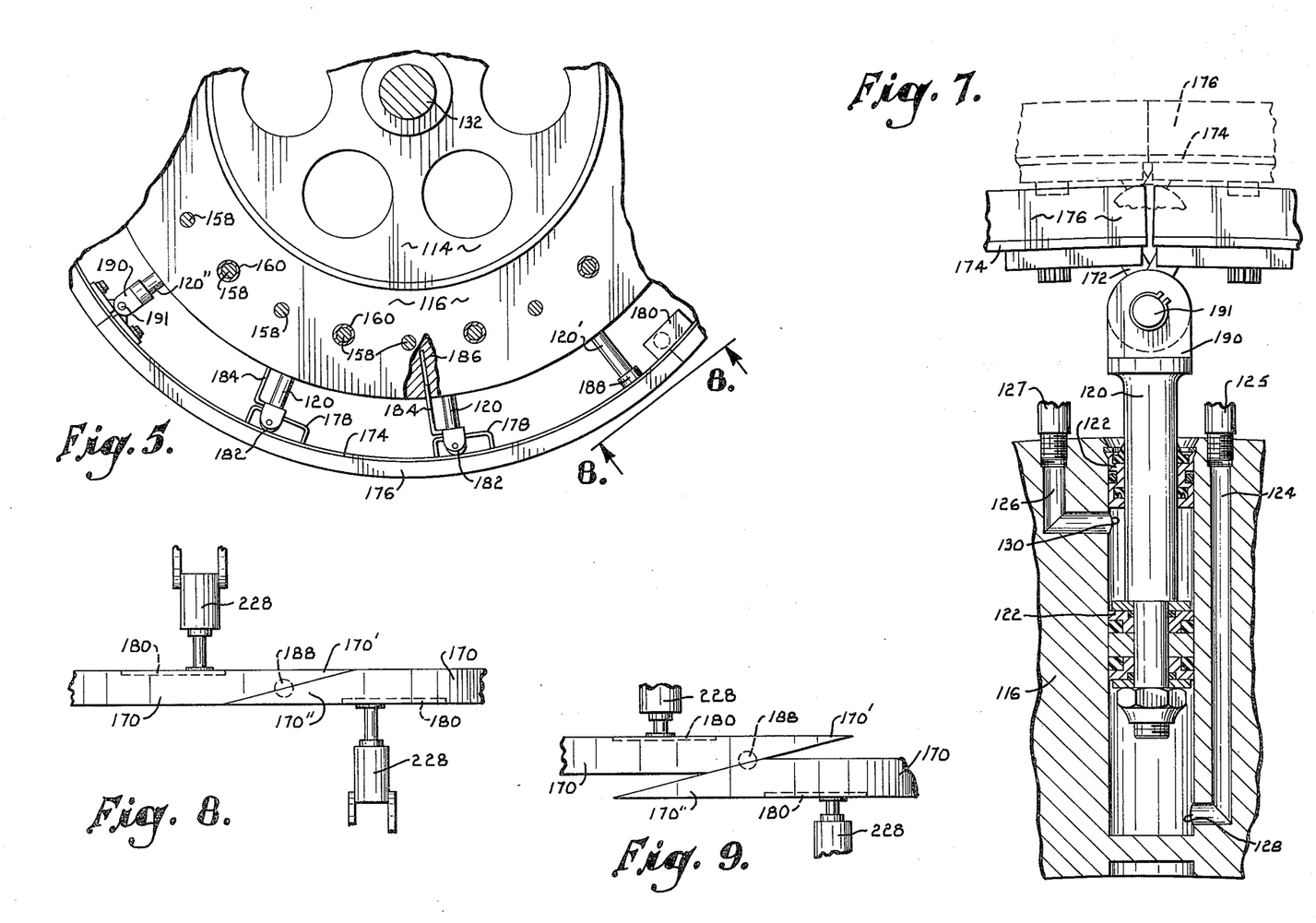
FIG. 5 is a fragmentary elevational view taken along line 5—5 of FIG. 2 with portions broken away and shown in cross section.
FIG. 7 is a further enlarged partially elevational and partially cross-sectional view showing details of the power cylinders which extend and retract the backup portion.
FIG. 8 is a fragmentary bottom plan view looking in the direction of arrows 8—8 of FIG. 5.
FIG. 9 is another bottom plan view from the same location as FIG. 8 showing the two backup segments moved into their retracted positions.

The weld backup housing section 84 comprises a central hub 114 which rigidly mounts a ring housing 116 provided with a plurality of circumferentially spaced cylinder bushings 118. As best illustrated in FIGS. 5 and 7, each cylinder mounts a piston 120 via piston seal cap assemblies 122 disposed on opposite ends of the piston. Each of assemblies 122 includes lock washers, thrust washers, and O-ring seals to assure fluid-tight operation. The outermost assembly 122 is held in place by a retaining ring received within bushing 118 and the inner assembly 122 is held in place by a nut and bolt extension of piston 120. Housing 116 is provided with passageways 124 and 126 leading to inner and outer ports 128 and 130 at each cylinder to accommodate the flow of fluid which effects two-way movement of each of the pistons 120. Central hub 114 is keyed to a central shaft 132 which extends in opposite directions from the hub.

Rigidly secured to hub 106 by nut and bolt assemblies 134 is a piston rod 136 having a central bore accommodating a bushing 138 and being slidably received by the shaft 132. A bushing 140 for piston rod 136 is mounted by a section 90' of housing 90 and the bushing is held in place by a retaining ring 142 secured to section 90' by bolts 144. Piston rod 136 is movable by virtue of its rigid coupling with a piston 146 which is sealably received by the cylinder presented by the internal surface of housing 90. A threaded end 148 of piston rod 136 receives a nut 150 to hold the piston rod to the piston. Piston 146 is, of course, movable in two directions by air pressure and appropriate ports (not shown) into the cylinder presented by housing 90 permit the flow of air into and out of the cylinder. It should also be understood that an identical cylinder and actuating mechanism are utilized for clamp members 28 in the housing section 86 on the opposite side of central hub 114.

Reference will now be made to that portion of the apparatus for moving housing section 86 away from sections 82 and 84 and in this regard particular attention is called to FIGS. 2 and 3. Mounted on annular plate 40 in circumferentially spaced relationship are a plurality of hydraulic cylinders 152. Each of the cylinders 152 is identical, is operable in two directions, and has a piston rod 154 which is received through an appropriate opening in plate 40.

It should be appreciated that housing section 86 is coupled with housing sections 82 and 84 by a plurality of telescoping bolt assemblies designated generally by the numeral 156 and best illustrated in FIG. 4. That portion of assembly 156 passing through one of the housing sections 82 or 86 serves as a push rod 158 which is rigid with piston rod 154 while that portion passing through the other section serves as a sleeve 160. Except for the rod 158 which is secured to each cylinder 152, each rod is provided with opposite threaded ends outside of the respective housing sections so as to receive retaining nuts 162 and 164 respectively. As indicated in FIG. 4, the end of each rod 158 is secured to a corresponding piston rod 154 to effect relative movement of the housing sections by cylinder 152. The nuts 162 on each rod are spaced from the adjacent housing wall a short distance so as to accommodate limited axial movement of the two housing sections. Although each rod 158 of bolt assembly 156 is illustrated in FIG. 5, and other figures as being of a solid construction, this has been done for brevity and clarity only and it is to be understood that some of the rods 158 will be characterized by a through bore to accommodate air, hydraulic, and electrical lines which must pass through the housing sections.

Referring now to FIGS. 5 and 7-12, details of the weld backup designated generally by the numeral 32 will be described. The weld backup comprises first and second portions designated generally by the numeral 166 each of which extends through an arc of approximately 180° and is complemental to the other portion. Each of portions 166 is identical and comprises two segments 168 and 170 which are joined together by a hinge coupling 172. The terminal ends 168' and 170' respectively are of a wedge-shaped configuration and are complemental to correspondingly configured terminal ends 168'' and 170'' of adjacent segments. It is important to note that each terminal end presents a wedge extending in a generally circumferential direction in parallelism with the circumference of the sourrounding pipe. This is to be contrasted with the wedge-shaped backup devices of the prior art wherein wedges have extended in a generally radial direction in perpendicular relationship to a tangent passing through a point on the circumference of the pipe.

Figure 10:
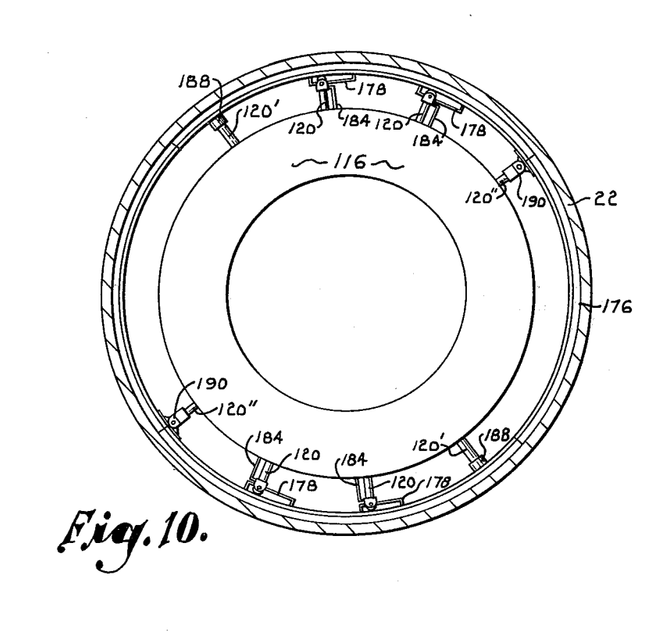
FIG. 10 is a partially schematic elevational view of the backup member as it appears in an extended position inside of a pipe joint which is shown in cross section.
Figure 11:
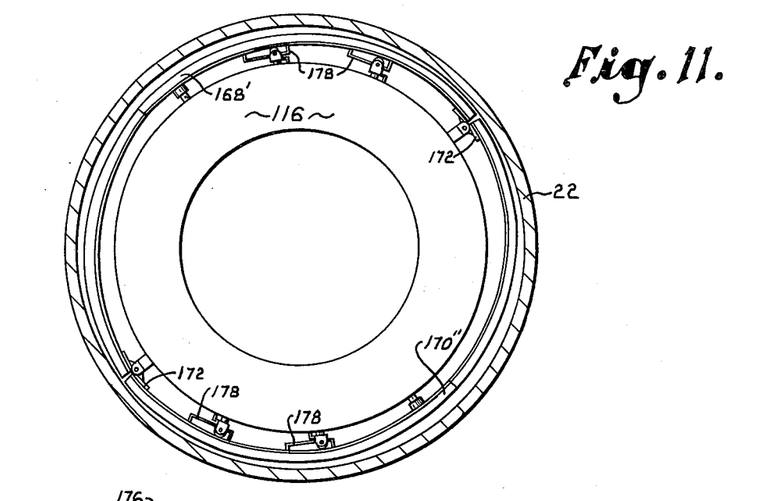
FIG. 11 is another elevational view, similar to FIG. 10, and showing the backup in a retracted position.
Figure 12:
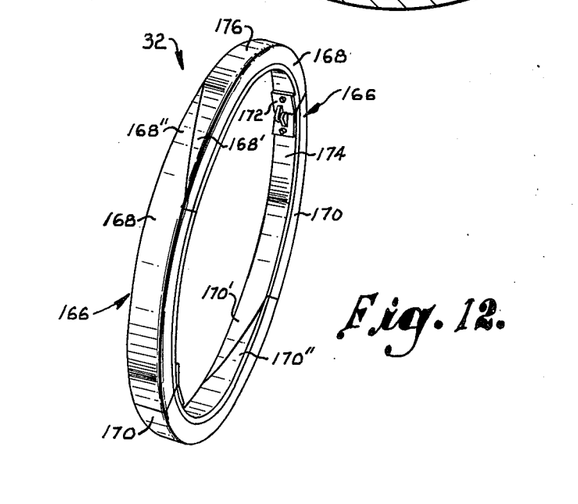
FIG. 12 is a partially schematic perspective view of the backup member in isolation.

As best illustrated in FIGS. 10 and 11, each of the portions 166 is disposed so as to place hinge couplings 172 at an acute angle relative to a perpendicular bisector of pipe joint 22. This in turn results in disposition of terminal ends 168', 168'', 170', and 170'' at locations which are also at acute angles relative to a perpendicular bisector of the pipe joints. This accomplishes one of the objectives of the invention by eliminating any seam whatsoever in the weld backup at the critical 12, 3, 6, and 9 o'clock positions around the circumference of the pipe.

Each segment 168 comprises a rigid arcuate support member 174 to which is rigidly secured a copper backup shoe 176. Backup shoe 176 is preferably constructed from an alloy comprising a dispersion of copper and aluminum oxide and characterized by a melting point of at least 1950° F. and a density of at least 0.317 lbs/cu. in. at 68° F. Secured to the back of support member 174 are a plurality of generally U-shaped brackets 178. Secured to each member 174 adjacent the terminal end of the segment is a pressure plate 180 (FIG. 8) for purposes to be made clear hereinafter.

As illustrated in FIG. 5, each of the pistons 120 which is intermediate hinge 172 and the end of the segment terminates in a roller 182 which is received by bracket 178. Each piston 120 is also provided with a piston guide 184 positioned to move along a bore 186 in housing 116. The piston 120' which is immediately beneath the terminal ends of segments 168 and 170 terminates in a ram 188 adapted to engage the segments at the line of juncture of the respective wedge-shaped terminal ends. Finally, the cylinder 120'' immediately beneath each hinge coupling 172 terminates in a bracket 190 which receives a hinge pin 191. It is to be understood, of course, that the arrangement of cylinders 120, 120' and 120'' repeats itself for each 90° around the periphery of the lineup clamp.

Referring again to FIG. 1 of the drawings, the structure for positioning the lineup clamp relative to the beveled end 24 of joint 22 is shown in detail. An elongated sensor arm 192 is integral with and extends downwardly from a bell crank 194 which is pivotally mounted by bracket 196 at one end. The other end of bell crank 194 is pivotally coupled with a ram 198 of a cylinder 200. Cylinder 200 is, in turn, pivotally mounted on an integral extension 202 of one of the bars 34. Springs 204 and 206 are positioned to bias cylinder ram 198 into its retracted position.

Figure 13:
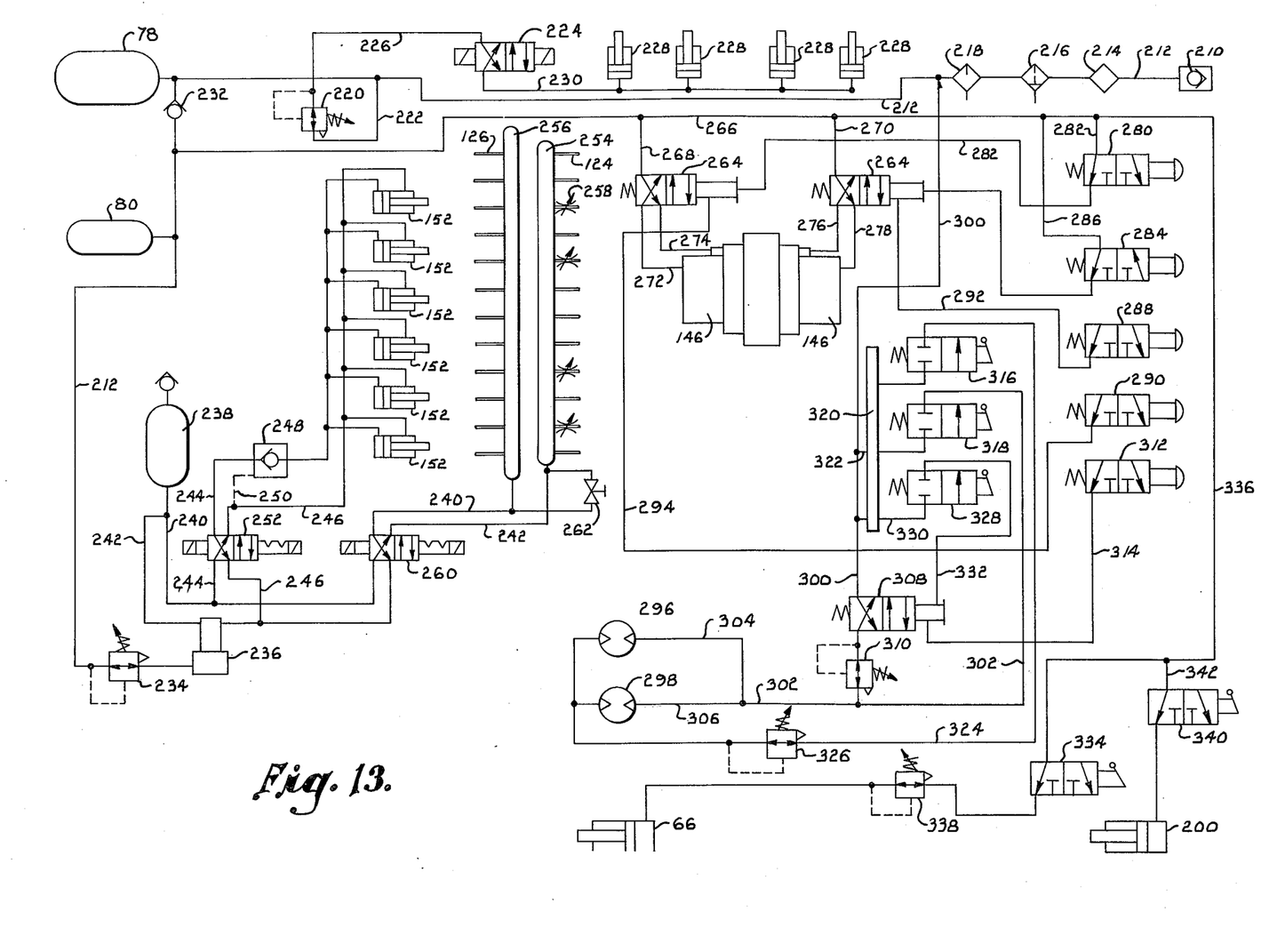
FIG. 13 is a hydraulic schematic for the apparatus of FIG. 1–12.

Referring now to the air-hydraulic schematic of FIG. 13 and the electrical schematic of FIG. 14, the control system for clamp 20 will be described. First of all, it is to be understood that both electrical and air lines from within the clamp would be directed to a nose cone 208 where a quick disconnect would be provided. This has not been shown in the drawing for purposes of clarity and in the sake of brevity but would be apparent to one skilled in this art. The quick disconnect would allow a reach rod (not shown) of either 40 or 80 feet in length to be connected to the nose with appropriate air and electrical connections and then threaded through a joint 22 so as to allow remote control of clamp 20. Referring to FIG. 13, a quick disconnect air coupling 210 is coupled with air supply line 202 which extends from coupling 210 to the main air supply tank 78. A gas treater 214, a filter 216, and a lubricator 218 disposed in line 212 are all of a conventional design apparent to anyone skilled in the art. A pressure regulator 220 is disposed in communication with supply line 212 through an air line 222 and also communicates with a four-way, air-operated solenoid valve 224 through an air line 226. Valve 224 is, in turn, in communication with four air cylinders 228 through an air line 230. Cylinders 228 are also visible in FIGS. 8 and 9 and are disposed immediately adjacent each abutting pair of wedge-shaped ends 168' and 168'' and 170' and 170'' where they can exert a force against pressure plates 180 to assure tight interengagement of the wedge-shaped ends.

From supply tank 78 the main air supply line 212 extends through a check valve 232 and communicates with the secondary supply tank 80 before extending on through a second pressure regulator 234. After passing regulator 234, line 212 communicates with an air operated hydraulic pump 236.

A tank 238 contains a reservoir of hydraulic fluid and communicates with pump 236 through lines 240 and 242. Spur lines 244 and 246 which communicate with hydraulic lines 240 and 242 respectively communicate these supply lines with hydraulic spacing cylinders 152 previously described. A pilot-operated check valve 248 is disposed in line 244 and is also in communication with line 246 via a pilot line 250. Operation of cylinders 152 is controlled by a solenoid operated, detent type, four-way flow control valve 252 disposed in lines 244 and 246.

From spur lines 244 and 246 hydraulic supply lines 240 and 242 continue on to hydraulic manifolds 254 and 256 respectively. Manifolds 254 and 256 have been omitted from FIGS. 2, 5, and 7, for the sake of clarity although it is to be understood that both manifolds communicate with cylinders 120 via passageways 124 and 126 and couplings 125 and 127 (FIG. 7). A flow control valve 258 has been illustrated in the line communicating with passageway 124 for certain of the cylinders although it is to be understood that such a flow control valve would be placed in each spur line extending from manifold 254 so as to accurately control the expansion of cylinders 120. A solenoid actuated four-way, detent type flow control valve 260 disposed in lines 240 and 242 ahead of manifolds 254 and 256 controls expansion and contraction of cylinders 120. A manual bypass valve 262 in communication with lines 240 and 242 immediately ahead of manifolds 254 and 256 allows for a release of pressure to permit retraction of cylinders 120 in the event of a failure in the hydraulic system.

The two main air cylinders 146 which control expansion and retraction of clamps 28 are illustrated schematically in FIG. 13 and each is operated by a four-way air actuated, spring biased control valve 264. A main trunk line 266 communicates with supply line 212 and spur lines 268 and 270 extending from trunk line 266 communicate the latter with valves 264. A first pair of connecting lines 272 and 274 extend from one valve 264 to one of the cylinders 146 and a second pair of connecting lines 276 and 278 extend from the other valve 264 to the second air cylinder 146.

The left-hand cylinder 146 is expanded by operating a three-way spring biased button valve 280 which is designed to relieve pressure from one side of valve 264 as a result of communication therewith through an air line 282. Valve 280 is normally disposed in its spring biased position wherein it communicates line 282 with trunk line 266. Similarly, a second three-way spring biased push button control valve 282 communicates with line 266 and the right-hand air valve 264 through an air line 286.

Movement of air cylinders 146 in the opposite direction to retract clamps 88 is also achieved by actuating air control valves 264. To this end, a second set of spring biased three-way push button valves 288 and 290 communicate with the right-hand and left-hand valves 264 through air lines 292 and 294 respectively.

Movement of clamp 20 along pipe 22 is accomplished through drive wheels 60 driven by air motors 296 and 298. Motors 296 and 298 are operated in one direction for forward travel of the clamp as a result of communication with air supply line 212 via a main trunk line 300 and connecting lines 302, 304 and 306. Likewise, air motors 296 and 298 operate in the opposite direction for reverse travel movement by virtue of their coupling with line 212 through main trunk line 300 and connecting line 324.

Forward movement of motors 296 and 298 is achieved by one of two sets of controls. A four-way air actuated control valve 308 is disposed in trunk line 300 and downstream from valve 308 is a pressure regulator 310. Valve 308 may be actuated by a push button bleeder valve 302 which communicates with the valve 308 through a connecting line 314. Operation of valve 312 permits flow of air through lines 300 and 302 to air motors 296 and 298. Valve 312 normally is operated for full forward speed of the motors when it is to travel the full length of a joint of pipe. For precise positioning of lineup clamp 20 once it has reached the end of the pipe joint, manually operable control valves are provided. A reverse control valve 316, and a forward control valve 318, are intercommunicated by a common manifold 320 which is in communication with supply line 212 through trunk line 300 and spur line 322. Reverse control valve 316 communicates with air motors 296 and 298 through a connecting line 324 having disposed therein a pressure regulator 326 which serves the same function as regulator 310 when the motors are operating in a forward direction. Forward control valve 318 connects with motors 296 and 298 through line 302.

A stop valve 328 which is also a manually operable spring biased two-position valve communicates directly with trunk line 300 via a connecting line 330 which bypasses manifold 320. This valve also communicates with valve 308 through a line 332.

Air cylinder 66 previously described and shown in FIG. 1 is controlled by a manually operable three-way air valve 334 disposed in an air line 336 extending from trunk line 266 to the cylinder. Also disposed in this line, downstream from valve 334, is a pressure regulator 338.

Air cylinder 200 which operates sensor arm 192 and is shown in FIG. 1 and described above, is controlled by a manually operable three-way control valve 340. This valve is disposed in a spur line 342 extending from line 336 to cylinder 200.

Figure 14:
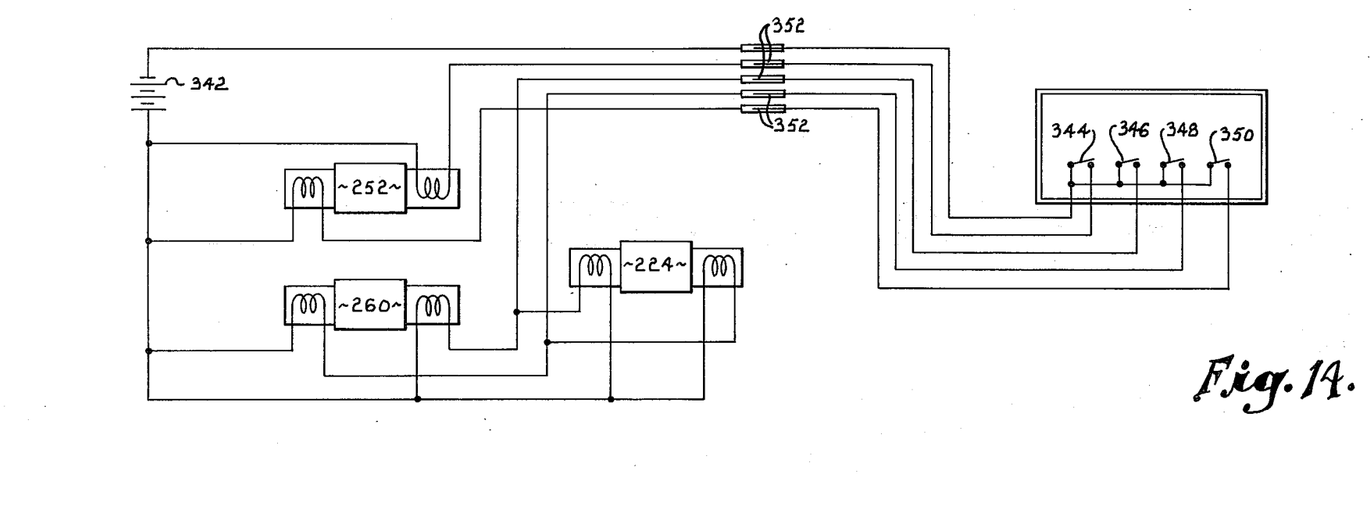
FIG. 14 is an electrical schematic for the apparatus.

Referring to FIG. 14, a six-volt DC power source 342 is provided for operating solenoid valves 224, 252 and 260. A first switch 344 is closed to energize a first coil of the solenoid of valve 252 and move the valve in one direction. A second switch 346 is closed to energize a first coil of the solenoid of valve 260 to move this valve in one direction and simultaneously energize one coil of the solenoid of valve 224 to move this valve in one direction. A third switch 348 is closed to energize the second coil of the solenoid of valves 260 and 224 to move these valves in the opposite direction and a fourth switch 350 is closed to energize the second coil of the solenoid of valve 252 to move this valve in the opposite direction. Quick disconnect couplings 352 allow each line of the electrical circuit to be connected and disconnected through use of the reach rod (not shown) above described.

In operation, clamp 20 is positioned in a joint of pipe 22 with clamping members 28 and 30 and weld backup 32 all in their retracted positions. Valve 334 is operated to actuate cylinder 66 and move drive wheels 60 into engagement with the interior surface of pipe joint 22. Pressure regulator 338 assures firm contact between the wheels and the pipe surface and yet prevents excessive pressure. The control button on valve 312 is pushed to activate motors 296 and 298 in the forward direction to move clamp 20 through the pipe. As the clamp approaches the end of the first pipe joint 22, valve 312 is released and the clamp will coast to a stop. It may then be slowly moved forward by operating valve 318 until framework 26 projects entirely from the terminal end of the pipe joint.

Next, cylinder 200 is actuated by operating valve 340 to bring sensor arm 192 into its extended position. Manual reversing valve 316 is then actuated to operate motors 296 and 298 in the reverse direction to backup the clamp until sensor arm 192 engages beveled edge 24. This positions the terminal edge of pipe joint 22 directly in line with weld backup 32 at a point slightly to the left of center when viewing FIG. 1.

The rearwardmost set of clamping members 28 are actuated by pushing the control button on valve 280 thus causing the left air cylinder 146 to move to the right. Individual clamping members 28 will engage the interior surface of pipe joint 22 in the manner indicated in FIG. 1. This cylinder should operate with sufficient force so as to cause clamping members 28 to correct any out-of-roundness condition of the pipe.

Cylinder 200 is returned to its retracted position by the force of springs 194 and 198 so as to allow for positioning of a second joint of pipe 22. As explained above, the elongated reach rod connected with nose cone 208 would be threaded through the next to be positioned joint which would be moved into abutting relationship to the first joint 22 as illustrated in FIG. 2. The second set of clamping members 30 are then expanded by pushing the control button on valve 284. This brings the second set of clamping members into engagement with the interior of the second pipe joint by moving right-hand cylinder 146 to the left. Next, spacing cylinders 152 are actuated by closing switch 344 thereby moving the second joint 22 from its position abutting the first joint as shown in FIG. 2 to a position slightly spaced from the first joint as indicated in FIG. 4. After the two joints are spaced apart, weld backup 32 is moved from its retractd position as shown in FIG. 2 to its extended position as shown in FIG. 4. This is accomplished by closing switch 346 thereby operating cylinders 120, 120', and 120''. The wedge-shaped ends of the complemental segments are capable of a sliding movement along their mating faces as they are moved outwardly from their retracted position of lesser diameter to their extended position of greater diameter. This sliding movement is possible as a result of the circumferentially extending wedges. Simultaneously, cylinders 228 are being activated so as to force the abutting wedge-shaped ends of the weld segments into tight engagement as illustrated in FIGS. 8 and 9.

Welding of the two joints together along their beveled edges may now be achieved. Superior welding results are achieved partially as a result of the spacing of the two joints a small distance apart. This, along with the presence of the backup 32, complete penetration on the root pass and eliminate the need for applying an internal weld bead. By virtue of the fact that there are only four seams throughout the entire circumference of the weld back (and may be as few as one) and these seams are all located in non-critical positions, the problem of backup material pickup by the weld is greatly minimized over what has been experienced with prior backup constructions. The circumferential welding operation is completed by making several passes around the pipe joints preferably by automatic equipment.

Upon completion of the weld, the backup 32 must be retracted before the lineup clamp can be moved through the pipe. This is achieved by closing switch 348 to cause solenoid valves 260 and 224 to move in the opposite directions thus retracting cylinders 120, 120', and 120'' as well as cylinders 128. As backup portions 166 move into their retracted positions, the abutting wedge-shaped ends of segments 168 and 170 can slide relative to each other as indicated in FIG. 9. To this end, it is desirable to adjust the stroke of cylinders 120 and 120' so that they move a distance slightly greater than the distance moved by cylinder 120'' which is coupled with hinge 172. By utilizing the wedge-shaped configuration at the abutting ends, it is possible to apply a lateral force through cylinders 228 to hold the segments in tight interengagement when the weld backup is extended and yet still permit the two segments to move relative to each other into a circle of smaller circumference when the weld backup is retracted. To this end, a series of springs 169, one of which is visible in FIG. 1, may be employed to bias each segment 168 and 170 into its retracted position. Alternately, more positive retracting force may be provided if desired by fluid piston and cylinder assemblies (not shown) substituted for the circumferential wedges again allow sliding movement of the two segments relative to each other thus accommodating a maximum degree of retraction without requiring a large number of individual segments. It will be recognized by those skilled in the art that while the invention has been described in its preferred form with reference to a backup member comprising four segments, a greater or lesser number of complemental segments having wedge-shaped terminal ends may be employed.

Clamping members 28 are retracted by pushing the control button on valves 288 and 290 thereby effecting movement of cylinders 146. Switch 350 is then closed to energize the second coil of valve 252 and bring the housing sections 82, 84 and 86 back into contiguous relationship through the action of cylinders 152. The lineup clamp is now ready to move forward through the pipe joint 22 in the same manner as previously described.

It should be pointed out that there is particular advantage in utilizing the air-over-hydraulic control system as above described for the lineup clamp. While a complete air system could be employed, a substantial increase in operating pressure for cylinders 152 and 120 may be obtained by converting air pressure to hydraulic pressure. Also, it is desirable to employ hydraulic cylinders for expanding the backup 32 and for spacing the housing sections as these movements require relatively critical tolerances which should be maintained uniform throughout wide variations in operating temperatures. A 100 percent air system would inherently experience some variations in operating parameters over a wide temperature range and this can be minimized by utilizing hydraulic cylinders. A 100% hydraulic system can also be employed with the clamp 20 although this complicates the problem of coupling and uncoupling a long reach rod to the clamp with the necessity of an external fluid reservoir. The disadvantages of a system employing all hydraulic or all air are eliminated with the present control system while incorporating the advantages of both systems.

Having thus described the invention, what is claimed as new and desired to be secured by letters patent is:

1. An internal pipe clamp comprising: a frame;
means mounted on the frame for supporting the latter for movement through the pipe;
a first housing section mounted on said frame and supporting a plurality of first clamping members adapted to be moved into clamping engagement with a first pipe joint;
a second housing section mounted on said frame and supporting a plurality of second clamping members in closely spaced relationship to said first clamping members and adapted to be moved into clamping engagement with a second pipe joint;
said first and second housing sections being axially aligned and movable relative to each other along said axis;
means for moving said first housing section relative to said second housing section;
means for moving said first and second clamping members into engagement with said first and second pipe joints;
weld backup means coupled with one of said housing sections intermediate said first and second clamping members and comprising first and second backup segments, each of said segments extending through an arc and terminating in a circumferentially extending wedge-shaped end complemental to the wedge-shaped end of an adjacent segment and adapted to be slidingly moved in a partially circumferential direction relative to an adjacent segment while being simultaneously moved in a radial direction; and means for applying a radial force toward and away from said segments to move the segments from an extended position of a greater diameter wherein a weld backup is presented to a retracted position of a lesser diameter to accommodate movement of the framework along the pipe.

2. Apparatus as set forth in claim 1, wherein is provided means for forcing each of the wedge-shaped terminal ends laterally into contiguous relationship with an adjacent terminal end as said segments are moved into their extended positions.

3. Apparatus as set forth in claim 2, wherein the means for applying a radial force toward and away from said segments comprises ram means positioned beneath each contiguous pair of terminal ends.

4. Apparatus as set forth in claim 3, wherein said segments are hingedly coupled at their ends opposite said wedge-shaped terminal ends and the means for applying a radial force toward and away from said segments further comprises ram means coupled with said hinge coupling.

5. Apparatus as set forth in claim 1, wherein said first and second housing sections are coupled together by a plurality of telescoping bolt assemblies.

6. Apparatus as set forth in claim 5, wherein the means for moving said housing sections comprises power cylinder means disposed for exerting a pushing force against one of said housing sections.

7. Apparatus as set forth in claim 1, wherein is included a third housing section coupled with one of said first and second housing sections and disposed intermediate the other two, said means for applying a radial force toward and away from said segments comprises two-way power cylinders disposed in said third housing section and coupled with said segments.

8. Apparatus as set forth in claim 7, wherein is included power means coupled with said frame for driving the latter through the pipe.

9. Apparatus as set forth in claim 1, wherein is included an elongated sensor arm disposed on said frame and movable from a retracted position to an extended position for engaging the terminal end of a first pipe joint before placement of a second pipe joint; and power cylinder means for moving said sensor arm from its retracted to its extended position.

10. Apparatus as set forth in claim 9, wherein said sensor arm is positioned clear of said weld backup means in its retracted position and including means for biasing said sensor arm toward its retracted position.

11. Apparatus as set forth in claim 1, wherein said means for moving the first and second clamping members is sequentially operable to first move the first clamping members and later move the second clamping members.

12. Apparatus as set forth in claim 11, wherein the means for effecting relative movement of said first and second housing sections and the means for applying a radial force toward and away from said segments comprises hydraulic cylinder means operable through a closed hydraulic system; and wherein is included a source of air under pressure; and means for coupling said air source with said hydraulic system and for maintaining a relatively constant pressure on said hydraulic system.

13. Apparatus as set forth in claim 1, wherein said weld backup means further comprises third and fourth segments, each of said segments extending through an arc of approximately 90 degrees.

14. Apparatus as set forth in claim 13, wherein said terminal end of each of said segments is disposed at an acute angle relative to a vertical bisector of a joint of pipe.

15. A weld backup device for use in the circumferential welding of cylindrical objects, said device comprising:

a supporting member disposed interiorly of said object;

first and second weld backup segments coupled with said supporting member;

each of said segments extending through an arc and terminating in a circumferentially extending wedge-shaped end complemental to the wedge-shaped end of an adjacent segment and adapted to be slidingly moved in a partially circumferential direction relative to an adjacent segment while being simultaneously moved in a radial direction; and means for applying a radial force toward and away from said segments to move the segments from an extended position of a greater diameter wherein said wedge-shaped terminal ends are in contiguous relationship and said segments cooperate to present a weld backup to a retracted position of lesser diameter for accommodating movement of the supporting member along said object.

16. Apparatus as set forth in claim 15, wherein is provided means for forcing each of the wedge-shaped terminal ends laterally into contiguous relationship with an adjacent terminal end as said segments are moved into their extended positions.

17. Apparatus as set forth in claim 16, wherein the lateral forcing means comprises plural power cylinder means disposed in opposed relationship at the terminal ends of said segments.

18. Apparatus as set forth in claim 16, wherein said terminal ends are disposed at an acute angle relative to a vertical bisector of a joint of pipe.

19. Apparatus as set forth in claim 18, wherein said means for applying a radial force toward and away from said segments comprises two-way power cylinders coupled with said segments.

20. Apparatus as set forth in claim 19, wherein the means for applying a radial force toward and away from said segments further comprises power ram means positioned beneath said contiguous pair of terminal ends.

21. Apparatus as set forth in claim 15, wherein each of said backup segments comprises a backup band having a copper alloy backup shoe coupled therewith, said copper alloy being characterized by a melting point of at least 1950° F. and a density of at least 0.317 lbs/cu. in. at 68° F.

22. Apparatus as set forth in claim 21, wherein said copper alloy comprises a dispersion of copper and aluminum oxide.

23. Apparatus as set forth in claim 15, wherein said means for applying a radial force toward and away from said segments comprises hydraulic cylinder means operable through a closed hydraulic system; and wherein is included a source of air under pressure, and means for coupling said air source with said hydraulic system and for maintaining a relatively constant pressure on said hydraulic system.

24. Apparatus as set forth in claim 15, wherein said weld backup means further comprises third and fourth segments, each of said segments extending through an arc of approximately 90°.

25. Apparatus as set forth in claim 24, where the terminal ends of each of said segments are disposed at an acute angle relative to a vertical bisector of a joint of pipe.

26. Apparatus as set forth in claim 15, wherein the means for applying a radial force is disposed in a plane lying intermediate the two objects.

27. Apparatus as set forth in claim 1, wherein the means for applying a radial force is disposed in a plane lying intermediate the two lengths of pipe.

* * * * *